United States Patent [19]
Smith

[11] Patent Number: 5,936,573
[45] Date of Patent: Aug. 10, 1999

[54] REAL-TIME KINEMATIC INTEGRITY ESTIMATOR AND MONITOR

[75] Inventor: Derek Steven Smith, Sunnyvale, Calif.

[73] Assignee: Trimble Navigation Limited, Sunnyvale, Calif.

[21] Appl. No.: 08/888,760

[22] Filed: Jul. 7, 1997

[51] Int. Cl.[6] .......................... G01S 05/02; H04B 7/185
[52] U.S. Cl. .......................................... 342/357; 701/213
[58] Field of Search .............................. 342/357; 701/213

[56] References Cited

U.S. PATENT DOCUMENTS 5,436,632  7/1995  Sheynblat ................................. 342/357

OTHER PUBLICATIONS

Dr. Nicholas C. Talbot, "Compact Data Transmission Standard for High–Precision GPS", *Journal of the Institute of Navigation*, pp. 1–10, (Sep./1996).

U.S. Patent Application No. 08/252,681, filed Jun. 2, 1994, entitled "Integrity Monitoring of Differential Satellite Positioning System Signals".

*Primary Examiner*—Mark Hellner
*Attorney, Agent, or Firm*—Blakely, Sokoloff, Taylor & Zafman

[57] ABSTRACT

A first receiver computes its position using data from sources chosen according to conditions at a second receiver and reference data. The computed position is compared with a known position. The data may be GPS positioning data from satellites and/or pseudolites and the reference data may be RTK GPS data provided by an RTK GPS reference station. The conditions at the second receiver generally correspond to satellite constellations and other parameters and the position of the first receiver may be computed by configuring the first receiver to mimic the conditions at the second receiver. The comparison of the computed position to the known position may result in an error measurement which may be used to initiate an alert condition. In a further embodiment, a receiver has first circuitry configured to compute its position using data from sources chosen according conditions at a remote receiver and reference data. The receiver may further include second circuitry for comparing the computed position with a known position. The first circuitry may include a GPS engine which is configured to compute the position from GPS data derived from GPS satellites and/or pseudolites. In yet another embodiment, a system includes a first unit and a second unit, the second unit being configured to compute its position using data from sources chosen according to conditions at the first unit and reference data. The system may also include a reference unit configured to provide RTK GPS reference data to the second unit.

34 Claims, 9 Drawing Sheets

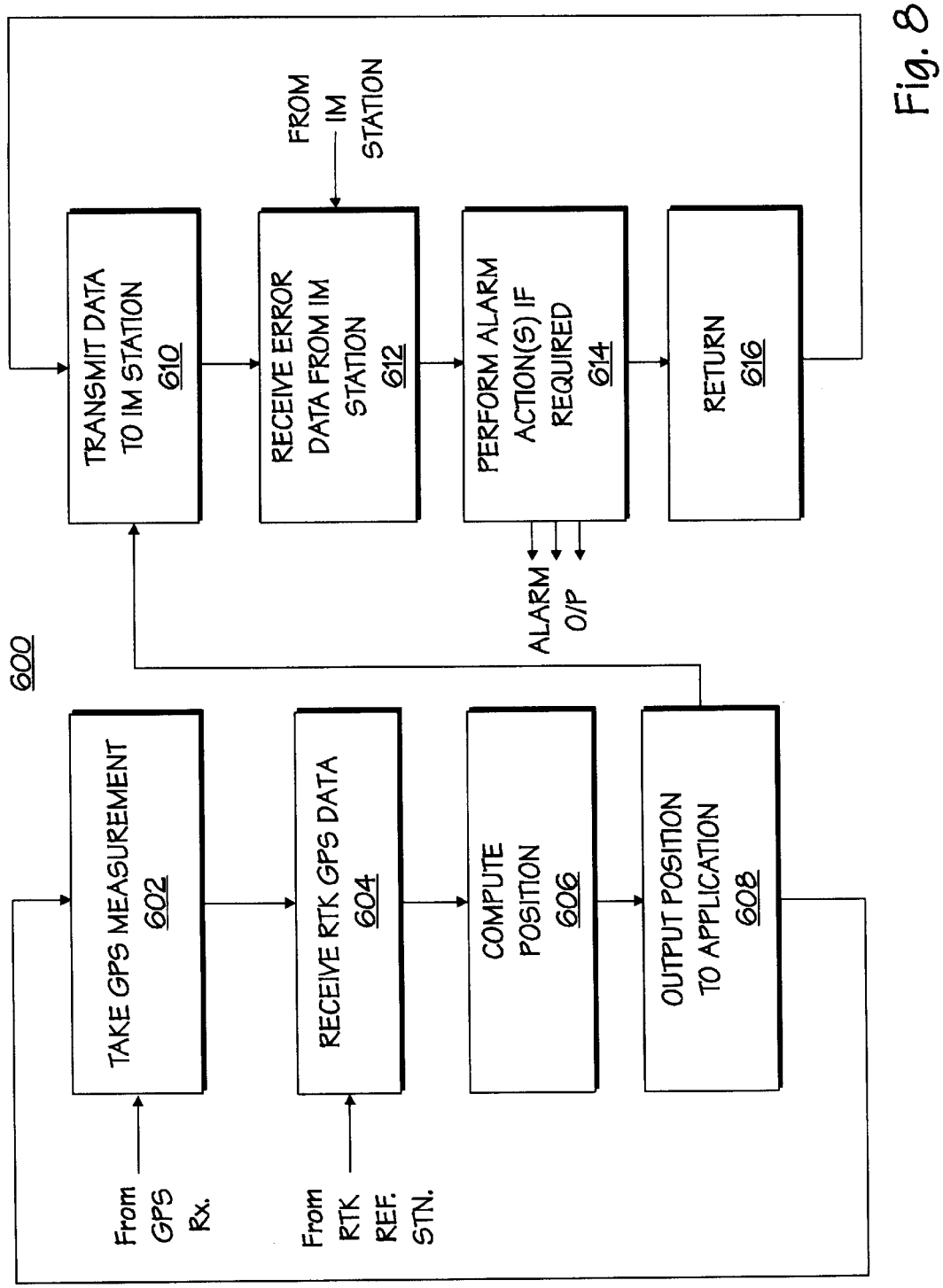

REAL-TIME KINEMATIC INTEGRITY ESTIMATOR AND MONITOR

FIELD OF THE INVENTION

The present invention relates to precise positioning systems and, more particularly, to real-time kinematic positioning systems utilizing Global Positioning System (GPS) receiver stations.

BACKGROUND

To assist sea, air, and land navigation and other purposes, the United States Government has placed a number of satellites in orbit around the Earth in such a manner that, from any point on the Earth, a user operating a roving receiver may have a line of sight to at least four satellites. This system is referred to as the Global Positioning System (GPS). A GPS receiver receives GPS data from the satellites; from the GPS data the roving receiver can determine its position. The GPS data includes data regarding the position of the satellite. However, the GPS data is corrupted by the U.S. Government in order to degrade the accuracy of calculations performed. Such errors are easily eliminated using the proper decoding algorithms and codes; however, such information is only available to the U.S. Military. Also, atmospheric and meteorological conditions, electromagnetic interference from terrestrial sources and other satellites, kinematic motion or orientation of the roving receiver and other uncertainties further degrade the signals.

To ameliorate this problem, land-based reference stations at fixed, known locations have been erected to receive satellite transmissions and interpret the signals to generate measurement corrections, also referred to as DGPS (differential GPS) corrections. Using the true, known position of the receiver antenna at each reference station, these land-based reference stations derive measurement corrections that adjust the GPS data to produce more accurate results. These measurement corrections are transmitted, for example, via minimum shift keying (MSK) transmissions, to the roving receivers as deviations or offsets to be added to the measurements derived by the roving receiver from the GPS signals received directly from the satellites. An example of such a system is the Differential GPS NAVSTAR system operated by the U.S. Coast Guard to help ships navigate more accurately.

To ensure that the corrections being broadcast by DGPS stations are useful, i.e., that the corrections are not providing inaccurate position determinations at the roving receivers, integrity monitoring stations have been established. As shown in FIG. 1, a DGPS integrity monitoring (IM) station 10 includes a receiver unit 12 having both GPS receiver circuitry and integral radio receiver circuitry. In other instances, the GPS receiver circuitry and radio circuitry may each comprise separate units. In either case, the radio receiver portion of DGPS IM station 10 receives the DGPS corrections as they are being broadcast by the DGPS station 14 to rover units 22 and provides these corrections to the GPS receiver circuitry. The GPS receiver circuitry of DGPS IM station 10 also receives GPS signals from orbiting GPS satellites 16 in the conventional manner and computes its position using the GPS data from those signals and the DGPS corrections provided by the radio receiver circuitry. The position obtained as a result of these calculations is compared to a known reference position 18 of the IM station 10 (e.g., as determined from a precise survey) and an error which represents the difference between the GPS computed position of the IM station 10 from its known location is derived (e.g., by a computer system 20 associated with the IM station 10). If the error between the known location 18 and the GPS computed location of the IM station 10 station is not within acceptable user established tolerances, the IM station 10 may report an alarm condition to the DGPS station 14 operators. This may alert the operators of the DGPS station 14 that inaccurate DGPS corrections are being broadcast and that appropriate corrective action should be taken.

While DGPS techniques are suitable for applications requiring only sub-meter accuracy (e.g., shipboard navigation and the like), they are not suitable for applications requiring precise positioning (e.g., on the order of ±1 cm.) because of the techniques used to obtain this accuracy. Precise positioning applications, for example machine control applications and the like, require the use of real-time kinematic (RTK) GPS techniques. RTK receivers use locally collected GPS signals broadcast by GPS satellites along with reference carrier-phase and code-phase signals transmitted from RTK reference stations to compute position results down to the centimeter level. Unlike the DGPS corrections broadcast by DGPS reference stations, the signals transmitted by the RTK reference stations (hereafter referred to as RTK GPS data) are specially formatted messages which include various satellite observables (e.g., carrier phase and pseudorange measurements) as seen by the RTK reference station.

Rather than computing positions by simply developing pseudoranges to each visible satellite based on the times codes being transmitted by the satellites, extremely accurate GPS receivers, such as RTK GPS receivers, utilize phase measurements of the radio carriers received from various GPS satellites to compute positions. However, this position determination technique requires that so-called integer ambiguities be resolved by the GPS receiver. The integer ambiguities result from the fact that the receiver must compute the number of 360° carrier phase shifts between itself and the GPS satellite, but each carrier cycle appears identical to the receiver. Sometimes, an RTK GPS receiver will produce a "bad fix" because the receiver failed to properly compute the correct number of integer phase shifts between itself and the GPS satellite(s). As a result, the receiver will report a ("bad") position that is based on a calculation which places the receiver either too close to or too far from the satellite.

As a result of the differences between RTK GPS receivers and other GPS receivers, the solution adopted by the DGPS community for integrity monitoring is unsuitable for RTK applications. To illustrate, consider that DGPS IM stations rely on the fact that the corrections being broadcast by a DGPS reference station are generally applicable to all roving GPS receivers operating in proximity to (e.g., up to approximately 300 miles from) the DGPS reference station. Thus, the DGPS IM station operating within a given area need only monitor the DGPS corrections being broadcast for that area and compute its GPS position accordingly. However, RTK GPS receivers must initialize to a selected group of integer carrier phase shifts for a selected group of satellites to obtain a position fix and there can be no guarantee that an RTK GPS receiver at an IM station has initialized to the same set of integer carrier phase shifts for these satellites as a roving receiver, especially if the roving receiver is operating in an area having a different visible sky from that seen at the RTK IM station. Because of these differences, position computations at a roving receiver may be different than position computations at an RTK GPS receiver at an IM station and, thus, the RTK IM station may not provide an accurate indication of the reliability of the RTK position at the rover.

For these reasons, an improved integrity monitoring scheme for RTK GPS applications is desired.

SUMMARY OF THE INVENTION

In one embodiment, the present invention provides a method which includes computing a position of a first receiver using data from sources chosen according to conditions at a second receiver and reference data. The computed position is compared with a known position of the first receiver. The data from the sources may be GPS positioning data and the reference data may be RTK GPS data. The reference data may be provided by an RTK GPS reference station, for example via radio link. The conditions at the second receiver generally correspond to satellite constellations and the position of the first receiver may be computed by configuring the first receiver to mimic the second receiver by initializing to the same satellite constellations. These conditions may be further augmented by one or more site parameter characteristics for the second receiver, such as signal-to-noise ratio for each satellite of the satellite constellations, rover vehicle attitude, and other parameters.

The comparison of the computed position to the known position may result in an error measurement being produced, the error measurement representing an offset between the computed position and the known position of the first receiver. This error measurement may be used to initiate an alert condition if the error measurement exceeds a preestablished threshold value.

In a further embodiment, the present invention provides a receiver having first circuitry configured to compute a position of the receiver using data from sources chosen according conditions at a remote receiver and reference data. The receiver may further include second circuitry for comparing the computed position with a known position. The first circuitry may include a GPS engine which is configured to compute the position from GPS data derived from the sources. The sources may be GPS satellites and or pseudolites.

In yet another embodiment, the present invention provides a system including a first unit and a second unit, the second unit being configured to compute its position using data from sources chosen according to conditions at the first unit and reference data. The system may also include a reference unit configured to provide the reference data to the second unit. Preferably, the reference data is RTK GPS data.

BRIEF DESCRIPTION OF THE DRAWINGS

The present invention is illustrated by way of example and not limitation in the figures of the accompanying drawings in which:

FIG. 8 is a flow diagram illustrating a routine for controlling operations at a rover unit in accordance with an embodiment of the present invention;

DETAILED DESCRIPTION

Figure 1:
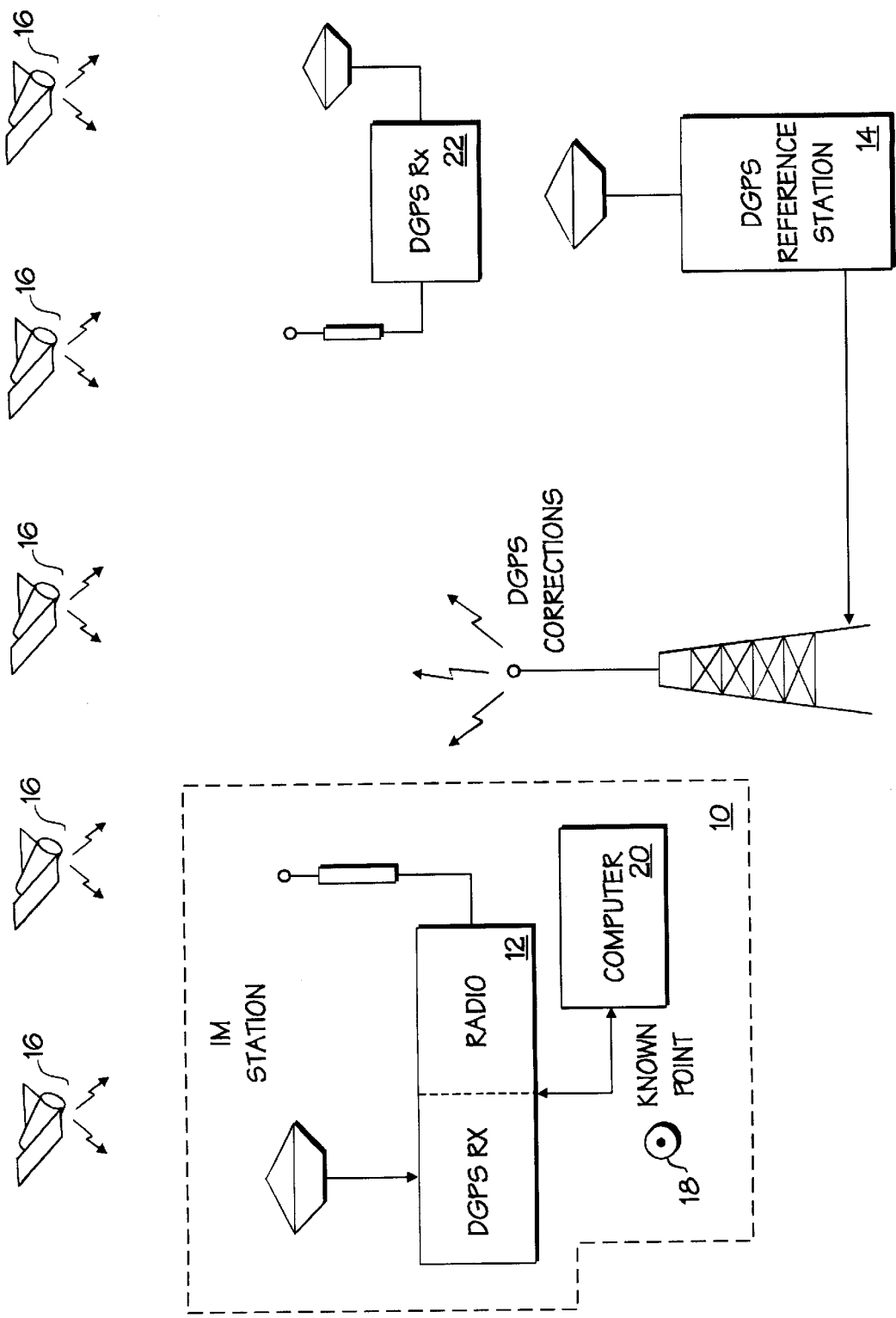
FIG. 1 illustrates a DGPS system including a DGPS integrity monitoring station.

Described herein is a Real-Time Kinematic (RTK) Integrity Monitor (IM). In one embodiment, a position of a first receiver may be computed using data from sources chosen according to conditions at a second receiver and reference data. The computed position is compared with a known position of the first receiver. The data from the sources may be GPS positioning data and the reference data may be RTK GPS data. The reference data may be provided by an RTK GPS reference station, for example via a radio or other link.

The conditions at the second receiver generally correspond to satellite constellations and the position of the first receiver may be computed by configuring the first receiver to mimic the second receiver by initializing to the satellite constellations and, in one embodiment, to one or more site parameter characteristics such as signal-to-noise ratio for each satellite of the satellite constellations, rover vehicle attitude, and other parameters for the second receiver. The comparison of the computed position to the known position may result in an error measurement being produced, the error measurement representing an offset between the computed position and the known position of the first receiver. This error measurement may be used to initiate an alert condition if the error measurement exceed a preestablished threshold value.

In a further embodiment, the present invention provides a receiver having fist circuitry configured to compute a position of the receiver using data from sources chosen according conditions at a remote receiver and reference data. The receiver may further include second circuitry for comparing the computed position with a known position. The first circuitry may include a GPS engine which is configured to compute the position from GPS data derived from the sources. The sources may be GPS satellites and or pseudolites.

In yet another embodiment, the present invention provides a system including a first unit and a second unit, the second unit being configured to compute its position using data from sources chosen according to conditions at the first unit and reference data. The system may also include a reference unit configured to provide the reference data to the second unit. Preferably, the reference data is RTK GPS data.

Although the methods and apparatus of the present invention are hereafter described with reference to GPS satellites, it will be appreciated that the teachings are equally applicable to positioning systems which utilize pseudolites or a combination of satellites and pseudolites. Pseudolites are ground based transmitters which broadcast a PRN code (similar to a GPS signal) modulated on an L-band (or other) carrier signal, generally synchronized with GPS time. Each transmitter may be assigned a unique PRN code so as to permit identification by a remote receiver. Pseudolites are useful in situations where GPS signals from an orbiting satellite might be unavailable, such as in tunnels, mines, buildings or other enclosed or semi-enclosed areas. The term "satellite", as used herein, is intended to include pseudolites or equivalents of pseudolites, and the terms GPS signals and/or GPS data, as used herein, are intended to include GPS-like signals and/or data from pseudolites or equivalents of pseudolites.

It will be further appreciated that the methods and apparatus of the present invention may be equally applicable for use with the GLONASS and/or other satellite-based positioning systems. The GLONASS system differs from the GPS system in that the emissions from different satellites are differentiated from one another by utilizing slightly different carrier frequencies, rather than utilizing different pseudo-random codes.

It should be recognized that the integrity measurements provided by the present invention are best understood as estimates because the integrity monitor can only mimic the actual conditions being experienced at a rover. This, in turn, means that the integrity monitor can only achieve an estimate of the RTK GPS data integrity being received at the rover. Nevertheless, the present invention provides an improved ability to monitor RTK GPS data being broadcast to rover units and therefore may find application in a variety of situations where extremely precise GPS receivers are employed.

Figure 2:
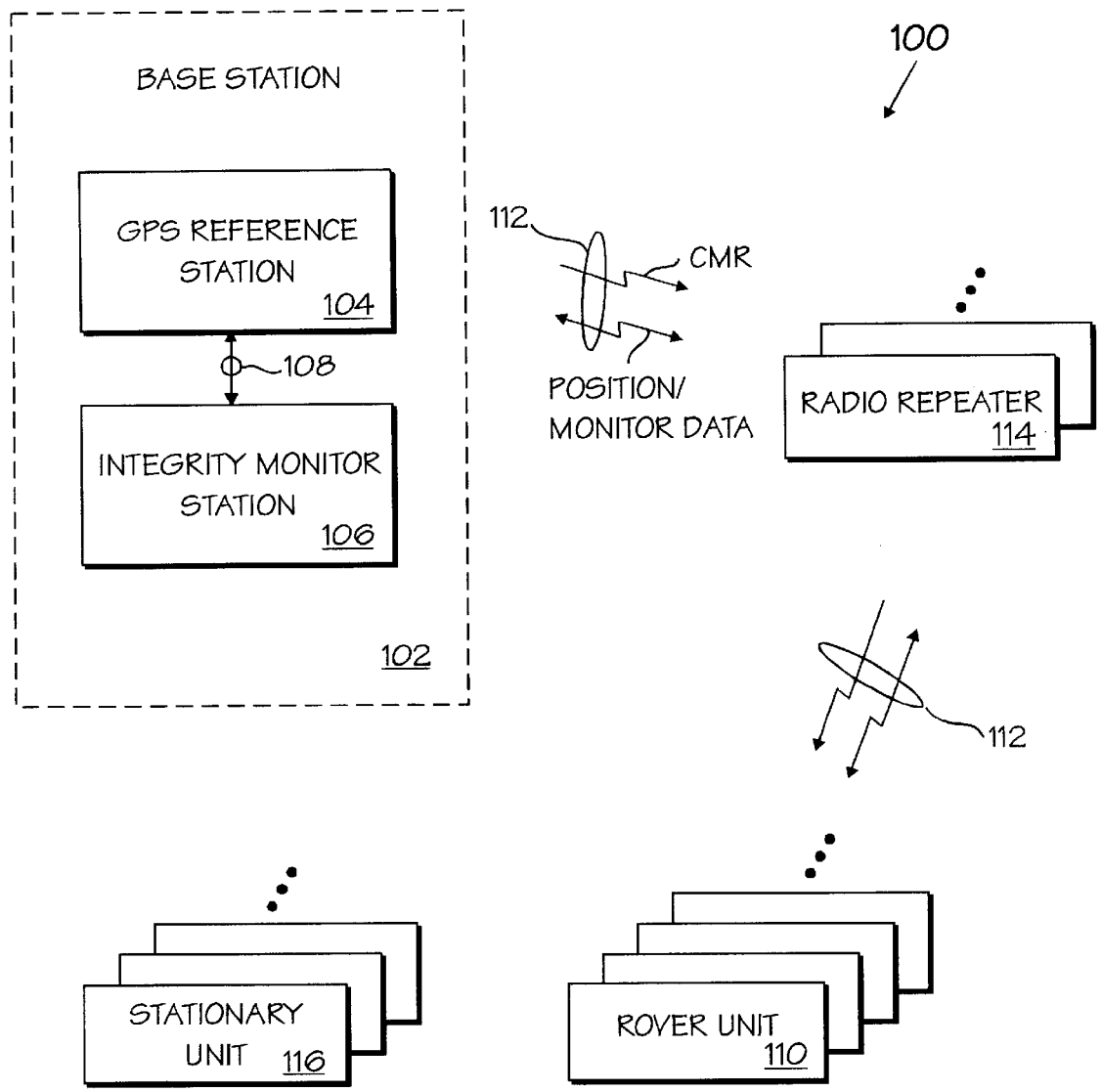
FIG. 2 illustrates a system having an RTK integrity monitoring station configured according to one embodiment of the present invention.

FIG. 2 illustrates a system 100 configured according to one embodiment of the present invention. In particular, system 100 includes a base station 102 located at a convenient site. Base station 102 includes an RTK GPS reference station 104 configured to provide RTK GPS reference data in the conventional fashion. Base station 102 also includes an RTK integrity monitoring (IM) station 106 configured to compute its location using data from GPS sources, for example, GPS satellites and/or pseudolites, chosen according to conditions at a remote unit and reference data provided by GPS reference station 104. The reference data may be provided across a link 108 between reference station 104 and IM station 106. Preferably, link 108 is a radio link (to more accurately simulate the rover conditions) although in other embodiments a hard wire link (or both) may be used.

System 100 also includes a number of rover units 110. Each rover unit 110 includes an RTK GPS receiver and generally operates in an area of interest. For example, rover units 110 may each be housed on various equipments (e.g., earth moving equipment, command or other vehicles, etc.) operating at a mine or construction site or within an agricultural field. Many other examples of RTK rover units can be realized, for example automobiles, individuals (e.g., surveyors) and other uses.

Rover units 110 are each configured to receive RTK GPS data from reference station 104 to assist in precise position determination. In one embodiment, the data link 112 between reference station 104 and rover units 110 may be a radio link with sufficient bandwidth to provide the updates required for the precise positioning calculations performed by rover units 110. The RTK GPS data may be provided in a format such as the compact measurement record (CMR) format described by Dr. Nicholas C. Talbot in "Compact Data Transmission Standard for High Precision GPS", Journal of the Institute of Navigation, September 1996. The CMR format encompasses both a message protocol and a compression/decompression algorithm for the reference data. CMR message blocks are packetized in frames and generally include header information along with satellite observable information (e.g., carrier phase and pseudorange measurements) as seen at reference station 104. Observables are transmitted from reference station 104 approximately once every second and reference station location and station description messages may be sent once every ten seconds. In general, the CMR message blocks contain all the information necessary for rover units 110 to compute their positions to centimeter accuracy. Another format which could be used is RTCM 2.1, however, this would require additional radio bandwidth because of the relatively large message format as compared to the CMR format.

Radio link 112 is generally a line of sight radio link and may require the use of radio repeaters 114 where no direct line of sight exists between reference station 104 and rover units 110. Such conditions may, for example, be encountered in mining operations where reference station 104 is positioned at an elevated location while rover units 110 are operating within the mine. Depending on the depth of the mine, rover units 110 may be out of sight of reference station 104, thereby requiring the use of repeaters 114.

In addition to rover units 110, system 100 may include various stationary units 116, each having an RTK GPS receiver. Stationary units 116 may correspond to, for example, offices located within the mine or other area of interest or, for example, may be operating platforms for which precise positions are required (e.g., drilling platforms). In addition, one or more stationary units 116 may correspond to rover units configured as remote integrity monitors as further described below.

As shown in FIG. 2, radio link 112 of system 110 maybe a two-way radio link between rover units 110 and/or stationary units 116 and base station 102. In such cases, in addition to RTK GPS data being transmitted from reference station 104, data may be transmitted from any of rover units 110 and/or stationary units 116 to base station 102 across radio link 112. In other embodiments, the link from rover units 110 and/or stationary units 116 to base station 102 may be a separate radio link.

The data provided by rover units 110 and/or stationary units 116 to base station 102 is formatted and includes information necessary to allow IM station 106 to compute its position using GPS sources chosen according to the conditions being experienced at the rover units 110 and/or stationary units 116. That is, a given rover unit 110 may transmit data to IM station 106 across radio link 112, that data including information necessary for IM station 106 to mimic the conditions being experienced at the transmitting rover unit 110. In particular, the data transmitted by rover unit 110 may include satellite identification information which allows IM station 106 to identify the particular satellite constellation to which the transmitting rover unit 110 has initialized. Such data may further include signal strength information for each satellite and other "site parameter" information such as rover position, attitude and/or other parameters. These site parameters may be used by the IM station 106 to position the rover units within a virtual model of the operating area and may further be used to predict multipath transmissions (e.g., by knowing that a rover is at a certain attitude with respect to a nearby reflecting surface such as a building) which may affect position calculation. By knowing the particular satellites (and other site parameters) which the transmitting rover unit 110 has used to compute its position, IM station 106, which includes a GPS receiver, may compute its own position using those same satellites. This allows IM station 106 to mimic the conditions being experienced at rover unit 110, even though IM station 106 may be capable of receiving signals from satellites other than those used by rover unit 110.

By mimicking the conditions being experienced at the transmitting rover unit 110, IM station 106 may then use the RTK GPS data provided by reference station 104 to compute its position. This computed position may be compared against a known position of IM station 106 (e.g., as determined by a precise survey) and an error produced thereby. The error will be a measurement of the difference between the computed position of IM station 106 (i.e., the position computed using GPS data as derived by mimicking the conditions being experienced at rover unit 110 and the reference data provided by reference station 104) and the known location. This comparison may be performed using dedicated circuitry at IM station 106 or it may be performed using a general purpose programmable microprocessor running suitable software. Because IM station 106 initialized to the same satellites as transmitting rover unit 110, the error derived at IM station 110 will provide an indication of the reliability of the RTK data being broadcast from reference station 104 to the transmitting rover unit 110.

Figure 3:
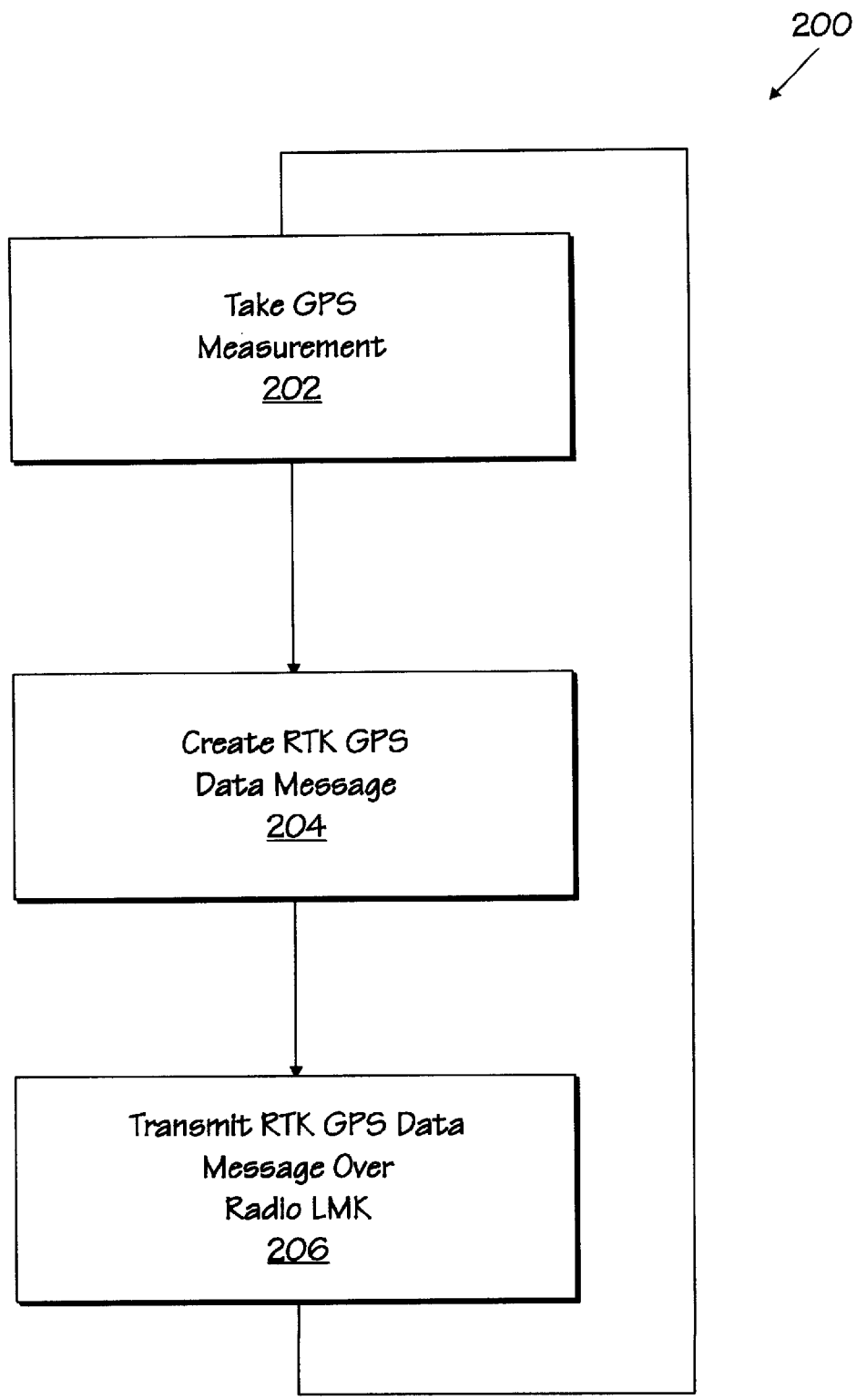
FIG. 3 illustrates an exemplary routine for creating and transmitting RTK GPS data according to an embodiment of the present invention.

FIG. 3 illustrates an exemplary routine 200 for creating and transmitting RTK GPS data at reference station 104. Routine 200 may be implemented on a general purpose programmable processor operating at reference station 104. Such an embodiment would be realized using programming techniques well known in the art. In other embodiments routine 200, or selected portions thereof, may be implemented in dedicated hardware and/or selectively programmed programmable logic. Such implementation details are essentially design choices and are often dictated by cost and/or board space considerations.

Routine 200 is essentially a loop where, so long as power is applied to the system, reference station 104 continually takes GPS measurements (step 202), creates RTK GPS data messages therefrom, e.g., according to the CMR format (step 204), and transmits those messages over radio link 112. Such a loop ensures that RTK GPS messages are continually provided, e.g., typically once per second. These messages may be augmented by demi-measurements at the rover units 110 to produce position updates at a rate of 10 Hz or more. Such an update rate allows for precise machine control.

Figure 4:
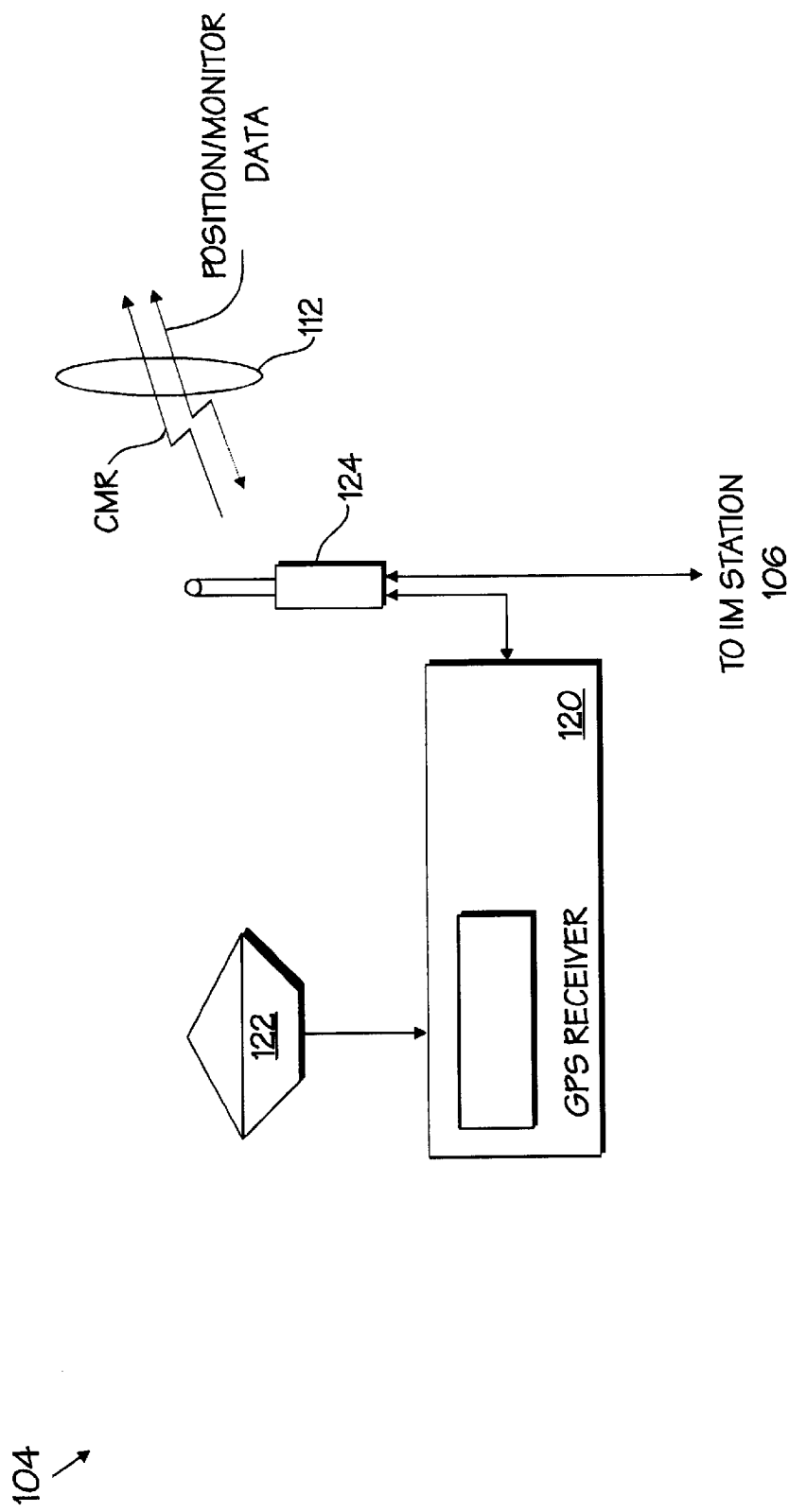
FIG. 4 illustrates an RTK reference station for use according to one embodiment of the present invention.

FIG. 4 further illustrates reference station 104 in greater detail. Reference station 104 includes a GPS receiver 120 having an associated GPS antenna 122. GPS receiver 120 is coupled to radio 124 which is used for transmitting RTK GPS data developed by GPS receiver 120 across radio link 112. Radio 124 may be a dual port radio which is configured to communicate with GPS receiver 120 as well as IM station 106. GPS receiver 120 may include the general purpose processor or other programmable logic which implements routine 200 of FIG. 3.

Figure 5:
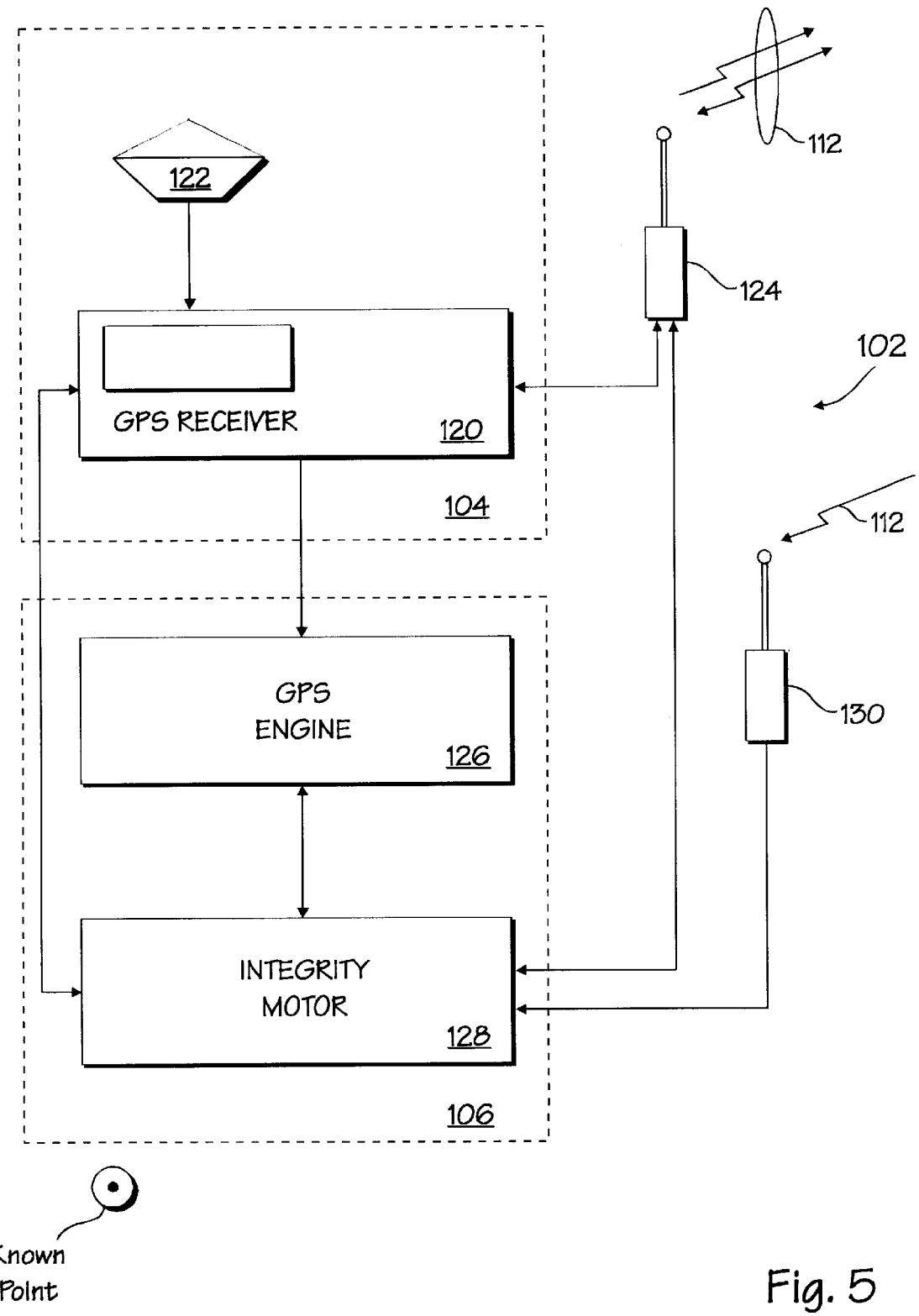
FIG. 5 illustrates an RTK integrity monitoring station configured according to one embodiment to the present invention.

FIG. 5 further illustrates IM station 106. IM station 106 includes a GPS engine 126 coupled to receive GPS data from GPS receiver 120 which is coupled to GPS antenna 122. GPS engine 126 is also coupled to integrity monitor 128 which is also coupled to receive a position solution from GPS receiver 120. Integrity monitor 128 is further coupled to the second port of radio 124, allowing integrity monitor 128 to receive transmissions from rovers 110 and stationary units 116. In operation, a transmitting rover unit 110 provides satellite identification information (and other site parameters) across radio link 112 to integrity monitor 128. Integrity monitor 128 provides this information to GPS receiver 120 which takes a GPS fix using the indicated satellites. This fix data along with RTK GPS data from reference station 104 may be provided to GPS engine 126 which computes a position solution. Thus, the position solution is based upon conditions being experienced by a transmitting rover unit 110. Integrity monitor 128 then compares this computed position with the known location of GPS antenna 122 to determine an error. The error may be reported from integrity monitor 128 across radio link 112 to the transmitting rover unit 110.

As discussed above, IM station 106 may also be configured to maintain a virtual model of the area in which the rovers 110 and stationary units 116 are operating. This may be accomplished by having the rovers 110 and stationary units 116 provide IM station 106 with their respective GPS positions, e.g., as one of the site parameters to be transmitted to the IM station 106. These position indications may be associated with other data identifying the transmitting rover 110 or stationary unit 116 and may be overlaid on a digital map of the operating area using programming techniques well known in the art. For example, conventional mapping or GIS programming techniques and data structures may be implemented to establish the digital model of the operating area.

Figure 6:
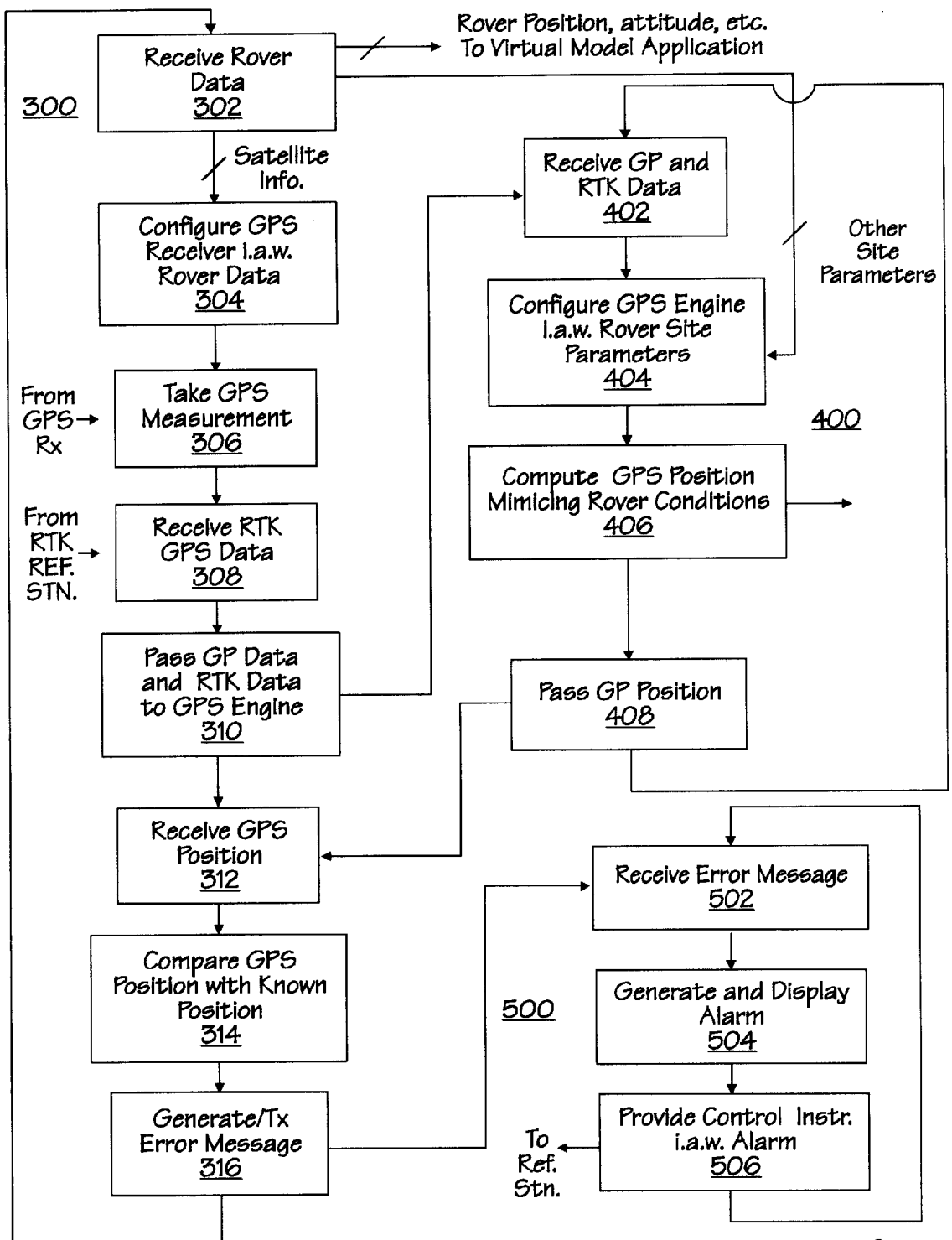
FIG. 6 is a flow diagram illustrating a variety of routines for performing integrity monitoring and control functions in accordance with one embodiment of the present invention.

FIG. 6 illustrates one possible set of routines which may be executed by one or more processors or other programmable devices which make up IM station 106. Of course, many other routines which implement similar functionality could be devised and, therefore, the set of routines shown in FIG. 6 should be regarded as illustrative of the various processes performed at IM station 106 only. As shown, IM station 106 implements an integrity monitor routine 300, a GPS measurement routine 400 and a control routine 500. Each of these routines communicate with each other to pass data and control information and thereby achieve the desired functionality. Each of these routines is discussed below.

Integrity monitor routine 300 compares a computed GPS position with a known position for the IM station 106 and provides an error message indicating the difference between these two positions in response thereto. The routine begins at step 302 where data (such as satellite information, rover position and other site parameters) is received from a rover 110 via radio link 112. This data may be provided to GPS measurement routine 400 as discussed below and may also be provided to a virtual model routine running on IM station 106 to position the rover 110 in the virtual model. Further, the satellite information is provided to GPS receiver 120. Using the satellite information, at step 304 GPS receiver 120 is configured to take a fix using the same satellites as are being used by rover 110. The fix is then taken and the GPS data derived therefrom is passed to routine 300 from GPS receiver 120 at step 306.

At step 308 (which may be performed substantially in parallel with step 306 in some embodiments), routine 300 receives RTK GPS data from reference station 104. This may be accomplished across radio link 112 where IM station 106 has a separate radio 130 (see FIG. 5) for receiving such messages. In other embodiments, the RTK GPS data may be provided across a dedicated (e.g. a hard wire) link. At step 310, routine 300 passes the GPS data from step 306 and the RTK GPS data from step 308 to GPS measurement routine 400 to compute a GPS position for IM station 106. This computation may be performed in the conventional fashion or using the other rover site parameters as described below and the output GPS position is reported to integrity monitor routine 300 at step 312.

At step 314, integrity monitor routine 300 compares the computed GPS position with the known position of IM station 106. The result of this comparison is used to generate an error message representing the difference between the computed GPS position and the known position. This error message may then be reported to the rover 110 and to the control routine 500 at step 316. The integrity monitor routine 300 then returns and waits to receive a new set of rover data.

GPS measurement routine 400 computes a GPS position for IM station 106 using GPS data derived from measurements taken by GPS receiver 120 and RTK GPS data from reference station 104. The routine first receives the computed position solution from integrity monitor routine 300 at step 402. Then, at step 404, the routine configures GPS engine 126 in accordance with the various rover site parameters received from the integrity monitor routine. This may include weighting the GPS measurements from GPS receiver 120 differently, according to reported signal-to-noise ratios from rover 110. Further, other weightings may be applied according to rover attitude, etc. This step is optional and in some embodiments will not be performed.

At step 406, the routine instructs GPS engine 126 to compute the GPS position of IM station 106 based on the above configuration, the GPS data from GPS receiver 120 and the RTK GPS data from reference station 104. This computed position is then reported to the integrity monitor routine 300 at step 408.

Control routine 500 receives the error message from integrity monitor routine 300 at step 502. Based on this message, appropriate alarm conditions may be generated and/or displayed at step 504. At step 506, the error message and/or alarm flags may be used to initiate appropriate control instructions, e.g., if the reported error exceeds preestablished thresholds. This may include automatically switching control to an alternate RTK reference station.

Figure 7:
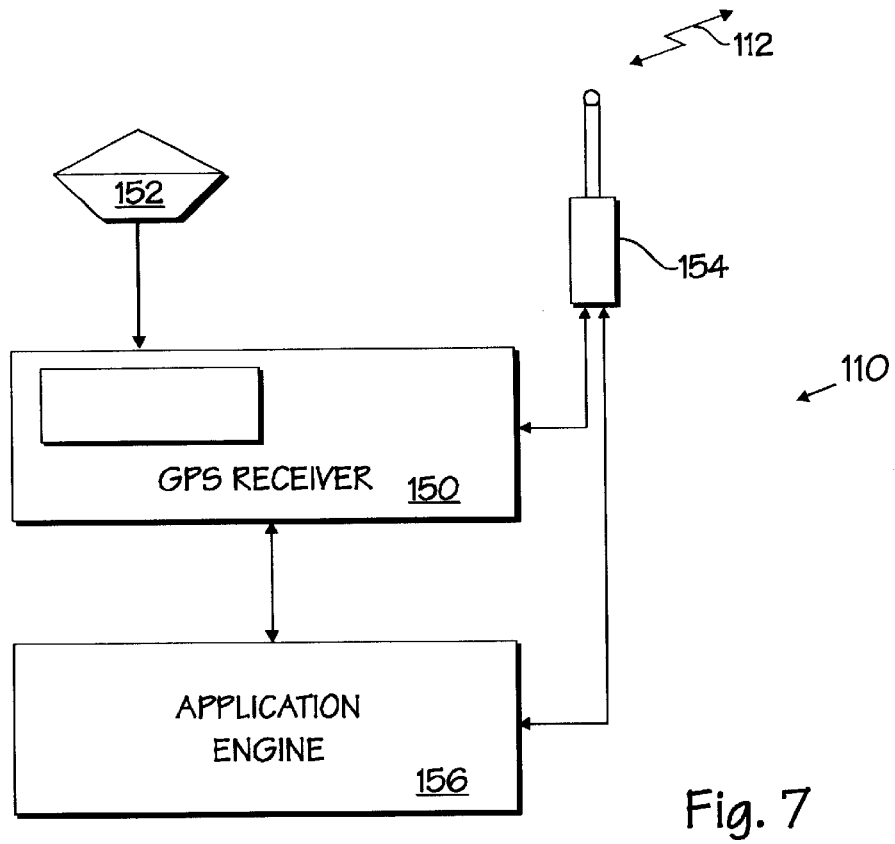
FIG. 7 illustrates a rover unit configured according to one embodiment of the present invention.

FIG. 7 illustrates an exemplary rover unit 110. Each rover unit 110 will typically include a GPS receiver 150 having an associated GPS antenna 152. GPS receiver 150 is configured as an RTK GPS receiver which is capable of receiving RTK GPS data through an associated radio 154. Such RTK GPS receivers are well known in the art. GPS receiver 150 is further capable of determining which satellites have been used for initialization (i.e., which satellites are being used for computing its position) and is configured to transmit that information across radio link 112 using radio 154 to IM station 106. Further, the rover 110 may be configured to report other site parameters, as described above. This information will allow IM station 106 to configure itself so as to mimic the conditions being experienced at rover unit 110 and may further allow IM station 106 to construct the virtual model of the operating area.

Rover unit 110 may further include an application engine 156. Application engine 156 will use the position information received from GPS receiver 150 as well as error information produced by IM station 106 to determine whether positions which are computed at rover unit 110 are within acceptable tolerances. That is, if the error exceeds a predetermined threshold, application engine 156 may recognize an alarm condition and report same to an operator associated with rover unit 110.

FIG. 8 illustrates a routine 600 which may be executed by one or more processors and/or other dedicated or programmable logic at rover unit 110. Routine 600 begins at step 602 where GPS measurements are taken by GPS receiver 150. At step 604 (which may be performed substantially in parallel with step 602 in some embodiments), rover 110 receives RTK GPS data from reference station 104 across radio link 112. This RTK GPS data, together with the GPS measurement data from step 602, is used to compute a position of rover 110 at step 606. At step 608, the satellite information used to compute this position may be passed to application engine 156 for further use.

Application engine 156 continues the operations defined by routine 600 and at step 610 transmits the satellite information (and other rover site parameters, e.g., signal-to-noise ratios for each satellite, rover position and/or attitude, etc., if desired) from step 606 to the IM station 106. As described above, IM station 106 uses this information to compute an error message which is returned to rover 110 at step 612. Based on the error message, at step 614 alarm conditions may be reported, e.g., if the position error exceeds preestablished thresholds. These error conditions may be acted on by other processing elements or routines within application engine 156. If no errors are reported, routine 600 continues to execute, thereby monitoring the position solutions provided by GPS receiver 150.

Figure 9:
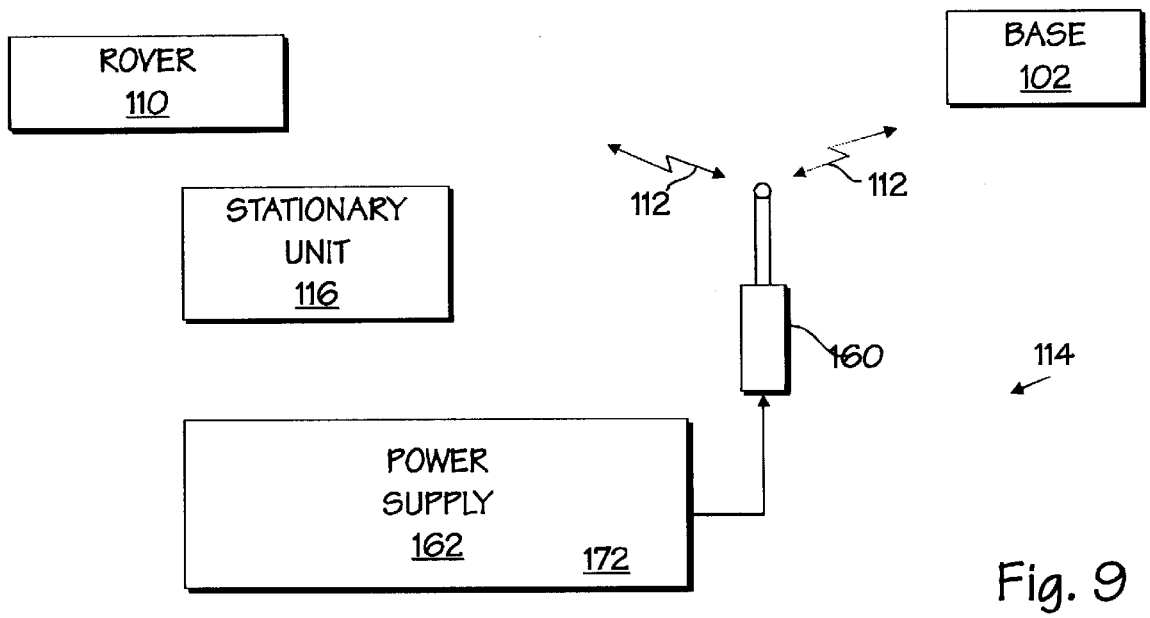
FIG. 9 illustrates a radio repeater for use according to an embodiment of the present invention.

FIG. 9 further illustrates the optional radio repeater 114. Radio repeater 114 may be a conventional repeater which includes a radio 160 and a power supply 162. The radio 160 is configured to receive and relay messages on radio link 112 between rovers 110 and/or stationary units 116 and base station 102.

Figure 10:
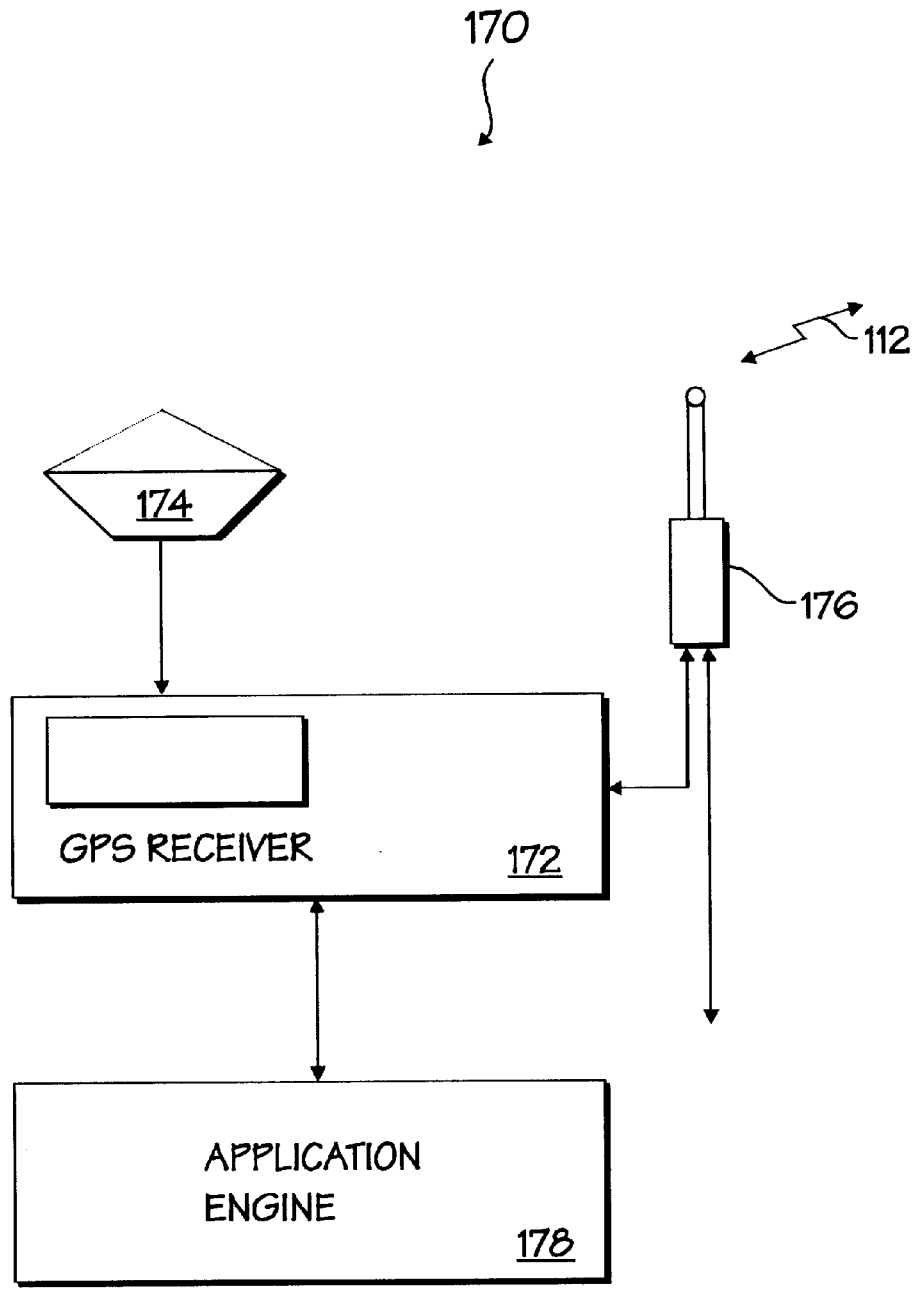
FIG. 10 illustrates a rover unit configured as a mobile integrity monitor station according to a further embodiment of the present invention.

FIG. 10 illustrates a rover unit which is configured as a mobile integrity monitor 170. Mobile integrity monitor 170 includes GPS receiver 172 and an associated GPS antenna 174. Mobile integrity monitor 170 also includes a radio 176 capable of interfacing to radio link 112. In operation, mobile integrity monitor 170 may be positioned over a known point 178 and left stationary for sometime. Over time, GPS receiver 172 will derive a highly accurate position of mobile integrity monitor 170 using conventional GPS surveying techniques. This highly accurate position may be compared against the known position of point 178 and an error determined thereby. This error can be used as a check on the RTK GPS data being provided by base station 102 across radio link 112. Moreover, the mobile integrity monitor 170 may be used as a regular IM station and the other rover units 110 may transmit data to the mobile integrity monitor 170 as for IM station 106. In some situations, a mobile integrity monitor 170 may be able to provide a better integrity estimation of the RTK GPS data being broadcast to the rovers 110 than is provided by IM station 106. This may be because, in general, mobile integrity monitor 170 will be operating under conditions more closely resembling those experienced by the rovers 110 due to its physical proximity to the rovers 110 within the operating area. This physical proximity may provide for more real-world conditions (e.g., multipath) than can effectively be mimicked at IM station 106.

Thus, a real-time kinematic integrity monitor has been described. Although described with reference to certain specific illustrated embodiments, those skilled in the art will appreciate that the present invention may find application in a variety of precise positioning determination systems. Accordingly, the present invention should only be measured in terms of the claims which follow.

What is claimed is:

1. A method comprising the steps of:
   computing a position of a first receiver using Global Positioning System (GPS) positioning data from sources chosen according to conditions at a second receiver, said conditions having been specified by data transmitted from said second receiver to said first receiver, and real-time kinematic (RTK) GPS reference data provided by an RTK GPS reference station; and
   comparing said computed position with a known position of said first receiver.

2. A method as in claim 1 wherein said conditions comprise particular satellite constellations.

3. A method as in claim 2 wherein said conditions further comprise signal-to-noise ratios for said satellite constellations and attitude information for a rover unit associated with said second receiver.

4. A method as in claim 2 wherein said step of computing further comprises configuring said first receiver to mimic said second receiver by initializing to said satellite constellations.

5. A method as in claim 4 wherein said reference data is provided via radio link.

6. A method as in claim 5 wherein said step of comparing further comprises determining an error measurement representing an offset between said computed position and said known position.

7. A method as in claim 6 further comprising initiating an alert condition if said error measurement exceeds a preestablished threshold value.

8. A method as in claim 6 further comprising transmitting said error measurement to said second receiver.

9. A method as in claim 8 further comprising initiating an alert condition at said second receiver if said error measurement exceeds a preestablished threshold.

10. A receiver comprising first circuitry configured to compute a position of said receiver using data from sources chosen according to conditions at a remote receiver, said conditions having been specified by data transmitted from said remote receiver to said receiver, and real-time kinematic (RTK) global positioning system (GPS) reference data.

11. A receiver as in claim 10 further comprising second circuitry for comparing said computed position with a known position of said receiver.

12. A receiver as in claim 11 wherein said first circuitry further comprises a GPS engine configured to compute said position from GPS data from said sources.

13. A receiver as in claim 12 wherein said first circuitry further includes a radio configured to provide said reference data to said GPS engine.

14. A receiver as in claim 13 wherein said radio is configured to receive said reference data from a reference station.

15. A receiver as in claim 14 wherein said second circuitry comprises a general purpose programmable microprocessor.

16. A receiver as in claim 15 wherein at least one of said sources is a GPS satellite.

17. A receiver as in claim 15 wherein at least one of said sources is a pseudolite.

18. A method as in claim 16 wherein said data transmitted from said remote receiver includes source identification information.

19. A method as in claim 18 wherein said data transmitted from said remote receiver further includes signal strength information for signals received at said remote receiver from said sources.

20. A system comprising:

a first unit configured to transmit data specifying conditions being experienced at said first unit; and a second unit configured to compute a position of said second unit using data from sources chosen according to said conditions at said first unit and real-time kinematic (RTK) global positioning system (GPS) reference data.

21. A system as in claim 20 further comprising a reference unit configured to provide said reference data.

22. A system as in claim 21 wherein said data specifying conditions comprises satellite identification information.

23. A system as in claim 22 wherein said second unit is further configured to compare said computed position to a known position of said second unit.

24. A system as in claim 23 wherein said second unit is further configured to report a result of a comparison of said computed position to said known position to said first unit.

25. A system as in claim 24 wherein said first unit is further configured to report an alarm condition when said result exceeds a predetermined threshold value.

26. A system as in claim 25 wherein said first unit further comprises an RTK GPS receiver.

27. A system as in claim 24 wherein said second unit further comprises a GPS engine configured to compute said position of said second unit according to said satellite identification information.

28. A system as in claim 27 further comprising a first radio link between said first unit and said second unit.

29. A system as in claim 28 further comprising a second radio link between said reference unit and said first unit.

30. A system as in claim 29 further comprising a third radio link between said reference unit and said second unit.

31. A system as in claim 30 wherein said first radio link between said first unit and said second unit includes a repeater unit configured to relay messages between said first unit and said second unit.

32. A system as in claim 31 wherein said messages include said satellite identification information.

33. A system as in claim 32 where in s aid messages further include said result of said comparison.

34. A system as in claim 33 wherein said repeater unit is further configured to relay said reference data between said reference unit and said first unit.

* * * * *

UNITED STATES PATENT AND TRADEMARK OFFICE
CERTIFICATE OF CORRECTION

PATENT NO.    : 5,936,573
DATED         : August 10, 1999
INVENTOR(S)   : Derek Steven Smith It is certified that error appears in the above-identified patent and that said Letters Patent is hereby corrected as shown below:

In column 4 at line 39, delete "fist" and insert --first--

Signed and Sealed this

Twentieth Day of March, 2001

Attest:

NICHOLAS P. GODICI

*Attesting Officer*    *Acting Director of the United States Patent and Trademark Office*